US010673156B2

(12) United States Patent
Hur et al.

(10) Patent No.: US 10,673,156 B2
(45) Date of Patent: Jun. 2, 2020

(54) CONNECTING DEVICE AND ELECTRONIC DEVICE INCLUDING THE SAME

(71) Applicants: Samsung Electronics Co., Ltd., Gyeonggi-do (KR); Hyupjinconnector Co., Ltd., Gyeonggi-do (KR)

(72) Inventors: Jang-Won Hur, Seoul (KR); Jae-Woon Lee, Gyeonggi-do (KR); Jung-Hyun Cho, Gyeonggi-do (KR); Seon-Tae Kim, Gyeonggi-do (KR); Jin-Woo Park, Gyeonggi-do (KR); Chang-Su Park, Gyeonggi-do (KR); Yoon-Jae Jung, Gyeongsangbuk-do (KR); Kyung-Bin Han, Gyeonggi-do (KR)

(73) Assignees: Samsung Electronics Co., Ltd (KR); Hyupjinconnector Co., Ltd (KR)

( * ) Notice: Subject to any disclaimer, the term of this patent is extended or adjusted under 35 U.S.C. 154(b) by 0 days.

(21) Appl. No.: 16/006,333

(22) Filed: Jun. 12, 2018

(65) Prior Publication Data

US 2018/0358726 A1    Dec. 13, 2018

(30) Foreign Application Priority Data

Jun. 12, 2017    (KR) .......................... 10-2017-0073330

(51) Int. Cl.
*H01R 12/71*    (2011.01)
*H01R 13/24*    (2006.01)
(Continued)

(52) U.S. Cl.
CPC ....... *H01R 12/714* (2013.01); *H01R 12/7076* (2013.01); *H01R 13/24* (2013.01);
(Continued)

(58) Field of Classification Search
CPC ...... H01E 12/714; H01E 12/706; H01E 13/24
(Continued)

(56) References Cited

U.S. PATENT DOCUMENTS 8,109,769 B1 *  2/2012  Ismail ................... H01R 12/73
                                                                    439/66
9,648,793 B2 *  5/2017  Nakamura ........... H05K 9/0035
(Continued)

FOREIGN PATENT DOCUMENTS

KR    1020160032519    3/2016
KR    1020160117136    10/2016
KR    1020180010885    1/2018

*Primary Examiner* — Alexander Gilman
(74) *Attorney, Agent, or Firm* — The Farrell Law Firm, P.C.

(57) ABSTRACT

A connecting device is provided that includes a movable part contacting an external contact terminal, and an elastic part connected to the movable part and configured to provide an elastic force enabling movement of the movable part. The connecting device also includes a support connected to the elastic part, and at least one protecting wall connected to the support and configured to protect the movable part from external forces. The connecting device further includes an extension extending from the at least one protecting wall in a direction along which the movable part moves and configured to bring the movable part close to the external contact terminal, and a base part provided within the extension and configured to reinforce the support.

8 Claims, 22 Drawing Sheets

(51) Int. Cl.
*H01R 12/70* (2011.01)
*H01R 13/03* (2006.01)
*H01R 43/20* (2006.01)
*H04M 1/02* (2006.01)

(52) U.S. Cl.
CPC ......... *H01R 13/2407* (2013.01); *H01R 13/03* (2013.01); *H01R 43/205* (2013.01); *H04M 1/0274* (2013.01)

(58) Field of Classification Search
USPC .......................................................... 439/81
See application file for complete search history.

(56) References Cited

U.S. PATENT DOCUMENTS

| | | | |
|---|---|---|---|
| 10,014,610 B2* | 7/2018 | Kurita | H01R 4/02 |
| 2005/0023018 A1* | 2/2005 | Horng | H05K 9/0035 |
| | | | 174/384 |
| 2010/0068901 A1* | 3/2010 | Yumi | H01R 13/03 |
| | | | 439/78 |
| 2014/0078008 A1* | 3/2014 | Kang | H01Q 5/35 |
| | | | 343/702 |
| 2015/0109170 A1* | 4/2015 | Kang | G06F 1/182 |
| | | | 343/702 |
| 2015/0155614 A1* | 6/2015 | Youn | H04M 1/0249 |
| | | | 343/702 |
| 2015/0222035 A1* | 8/2015 | Kurita | H05K 9/0016 |
| | | | 439/876 |
| 2018/0026406 A1* | 1/2018 | Kim | H01R 13/74 |
| | | | 439/572 |
| 2018/0358726 A1* | 12/2018 | Hur | H01R 12/7076 |

\* cited by examiner

CONNECTING DEVICE AND ELECTRONIC DEVICE INCLUDING THE SAME

PRIORITY

This application is based on and claims priority under 35 U.S.C. § 119(a) to a Korean Patent Application No. 10-2017-0073330, filed in the Korean Intellectual Property Office on Jun. 12, 2017, the entire disclosure of which is incorporated herein by reference.

BACKGROUND

1. Field

The present disclosure generally relates to connecting devices and electronic devices including such connecting devices, and more particularly, to connecting devices with restricted deformation and electronic devices including the same.

2. Description of the Related Art

An electronic device performs a particular function according to its equipped program, such as, for example, a home appliance, an electronic scheduler, a portable multimedia player, a mobile communication terminal, a tablet personal computer (PC), a video/sound device, a desktop PC or laptop computer, a navigation for automobile, etc. For example, electronic devices may output stored information as voices or images. An electronic device comes with integrated functionality, including, for example, an entertainment function, such as playing video games, a multimedia function, such as replaying music/videos, a communication and security function for mobile banking, and a scheduling or e-wallet function.

Electronic devices may include connecting devices for connection between electronic parts or between the electronic parts and circuit boards.

A connecting device may include a bottom plate affixed to a board and a movable part configured to be movable and contacting a target. The movable part may be formed in a C-clip shape. The movable part may include a contacting part that directly contacts an electronic part and an elastic part that may impart an elastic force onto the contacting part as the contacting part is contacted.

In the C clip-shaped connecting device, the overall movable part including the contacting part may be excessively pressed down, floated up, or twisted aside by an external force applied from above the contacting part, an external force applied from bottom to top, or an external force applied from the front or side surface of the contacting part, deforming the contacting terminal and resulting in a faulty connection. In the connecting device, the elastic part may gradually lose elasticity due to steady and repetitive pressing, causing the contacting part to poorly restore and result in an unstable connection. The application of an excessive external force over the elastic limit of the elastic part may subject the elastic part to plastic deformation, disabling the contacting part from returning to its original position, and thus, breaking the connection with the electronic part.

SUMMARY

According to an embodiment of the present disclosure, a connecting device is provided that may restrict abnormal movements of the movable part due to various external forces, preventing deformation of the connecting device and a lowering an elasticity of the elastic part due to steady and repetitive pressing on the movable part.

According to another embodiment of the present disclosure, a connecting device is provided that is prevented from deforming by external impacts.

In accordance with an embodiment of the present disclosure, a connecting device is provided that includes a movable part contacting an external contact terminal, and an elastic part connected to the movable part and configured to provide an elastic force enabling movement of the movable part. The connecting device also includes a support connected with the elastic part, and at least one protecting wall connected to the support and configured to protect the movable part for external forces. The connecting device further includes an extension extending from the at least one protecting wall in a direction along which the movable part moves and configured to bring the movable part close to the external contact terminal, and a base part provided within the extension and configured to reinforce the support.

In accordance with another embodiment of the present disclosure, an electronic device is provided that includes a connecting device having a housing including a first surface, a second surface positioned opposite the first surface, and a side part connecting the first surface with the second surface, a connecting part protruding from the side part to an inside of the housing, and a circuit board disposed inside the housing. The connecting device electrically connects the connecting part with the circuit board. The connecting device includes a movable part contacting the connecting part, an elastic part connected to the movable part and configured to provide an elastic force enabling movement of the movable part, and a support connected to the elastic part. The connecting device also includes at least one protecting wall connected to the support and configured to protect the movable part from external forces. The connecting device further includes an extension extending from the at least one protecting wall in a direction along which the movable part moves and configured to bring the movable part close to the external contact terminal, and a base part provided within the extension and configured to reinforce the support.

In accordance with an additional embodiment of the present disclosure, a method for manufacturing an electronic device including a connecting device is provided. A housing is prepared including a first surface, a second surface positioned opposite the first surface, a side part connecting the first surface with the second surface, and a connecting part protruding inward from the side part. A circuit board is disposed, on which the connecting device is mounted in the housing. The connecting device includes a movable part, an elastic part configured to provide an elastic force enabling movement of the movable part, a support connected to the elastic part, at least one protecting wall configured to protect the movable part from external forces, an extension extending from the at least one protecting wall in a direction along which the movable part moves and configured to bring the movable part close to the connecting part, and a base part configured to reinforce the support. The connecting device is brought in contact with the connecting part.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Embodiments of the present disclosure are described in detail with reference to the accompanying drawings. The same or similar components may be designated by the same or similar references numerals although they are illustrated in different drawings. Detailed descriptions of constructions or processes known in the art may be omitted to avoid obscuring the subject matter of the present disclosure.

An electronic device, according to embodiments of the present disclosure, may be one of various types of electronic devices. The electronic devices may include at least one of, for example, a portable communication device (e.g., a smartphone), a computer device, a portable multimedia device, a portable medical device, a camera, a wearable device, or a home appliance. The electronic device is not limited to the above-listed embodiments.

The embodiments of the present disclosure and the terms used herein are not intended to limit the techniques set forth herein to particular embodiments and various changes, equivalents, and/or replacements therefor also fall within the scope of the present disclosure. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, such as, for example, "logic," "logic block," "part," or "circuit." A module may be a single integral part or a minimum unit or part for performing one or more functions. For example, the module may be configured in an application-specific integrated circuit (ASIC).

Figure 1:
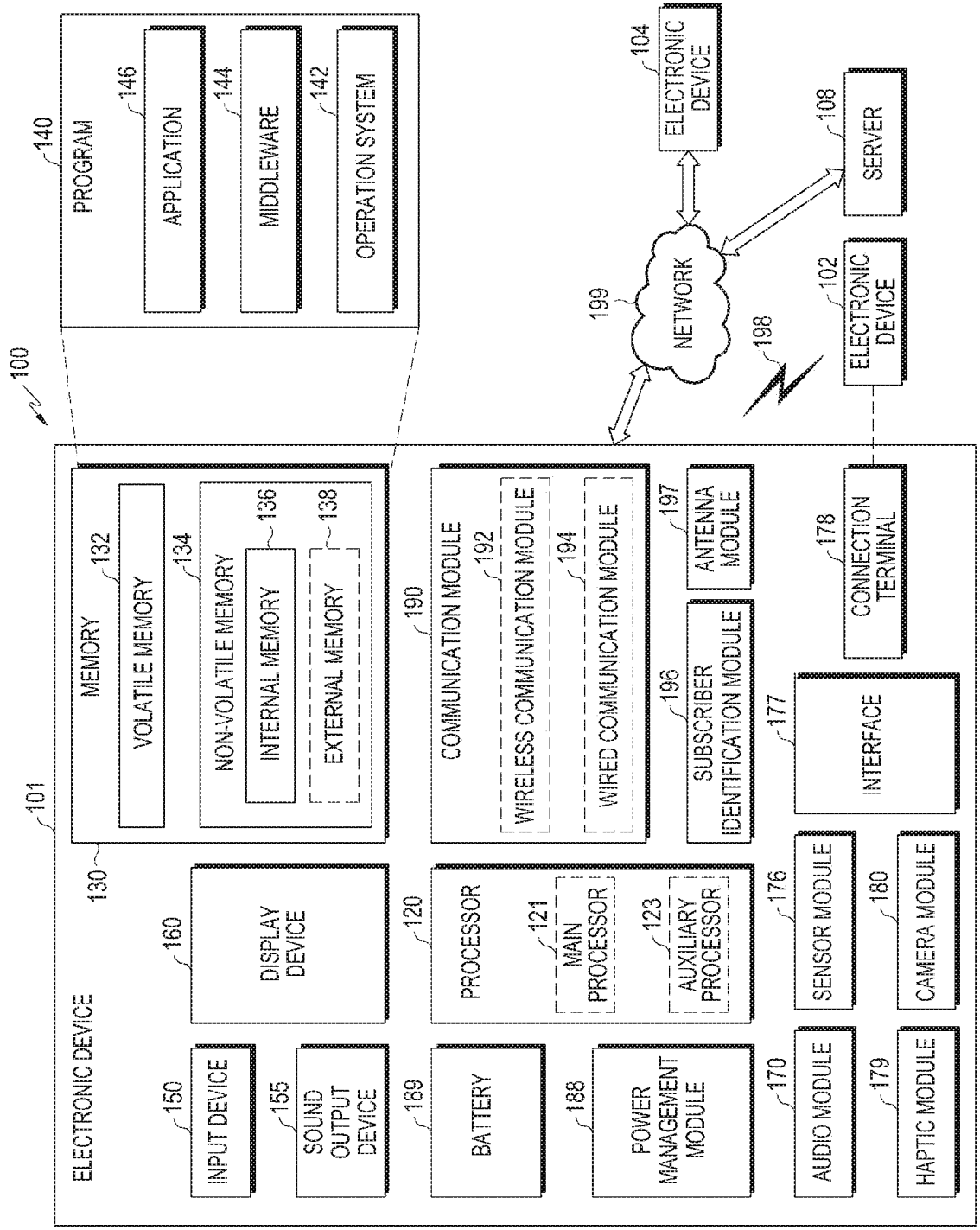
FIG. 1 is a block diagram illustrating an electronic device in a network environment, according to an embodiment.

Embodiments set forth herein may be implemented as software (e.g., a program 140 of FIG. 1) containing commands that are stored in a machine, such as, for example, a computer-readable storage medium (e.g., an internal memory 136 of FIG. 1 or an external memory 138 of FIG. 1). The machine may be a device that may invoke a command stored in the storage medium and may be operated as per the invoked command. The machine may include an electronic device (e.g., an electronic device 101 of FIG. 1) according to embodiments disclosed herein. When the command is executed by a processor (e.g., a processor 120 of FIG. 1), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

A method according various embodiments of the disclosure may be included and provided in a computer program product. The computer program product may be traded as commodities between sellers and buyers. The computer program product may be distributed in the form of a machine-readable storage medium (e.g., a compact disc read only memory (CD-ROM)) or online through an application store. When distributed online, at least part of the computer program product may be temporarily generated or at least temporarily stored in a storage medium, such as the manufacturer's server, a server of the application store, or a relay server.

According to embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

FIG. 1 is a block diagram illustrating an electronic device in a network environment, according to an embodiment Referring to FIG. 1, the electronic device 101 in a network environment 100 may communicate with a first external electronic device 102 via a first network 198 (e.g., a short-range wireless communication network), or a second electronic device 104 or a server 108 via a second network 199 (e.g., a long-range wireless communication network). The electronic device 101 may communicate with the second electronic device 104 via the server 108. The electronic device 101 includes a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. The electronic device 101 may exclude at least one (e.g., the display device 160 or the camera module 180) of the components or add other components Some components may be implemented to be integrated together, such as, for example, the sensor module 176 (e.g., a fingerprint sensor, an iris sensor, or an illuminance sensor) embedded in the display device 160 (e.g., a display).

The processor 120 may drive software (e.g., the program 140) to control at least one other component (e.g., a hardware or software component) of the electronic device 101 connected with the processor 120, and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 includes a main processor 121 (e.g., a central processing unit (CPU) or an application processor (AP)), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, includes an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, for example, a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, for example, a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device, such as, for example, the first external electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connection terminal 178 may include a connector, such as, for example, an HDMI connector, a USB connector, an SD card connector, or an audio connector (e.g., a headphone connector), which is able to physically connect the electronic device 101 with an external electronic device (e.g., the first external electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 includes a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through the first network 198 (e.g., a short-range communication network, such as bluetooth, wireless-fidelity (Wi-Fi) direct, or infrared data association (IrDA)) or the second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the second external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. When the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
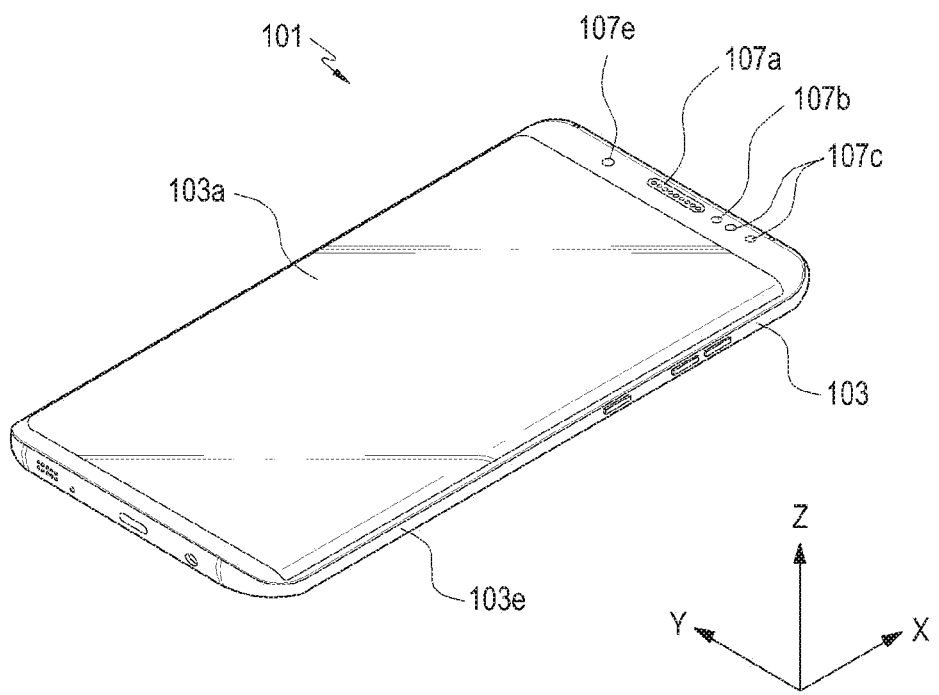
FIG. 2 is a diagram illustrating a front view of an electronic device, according to an embodiment.
Figure 3:
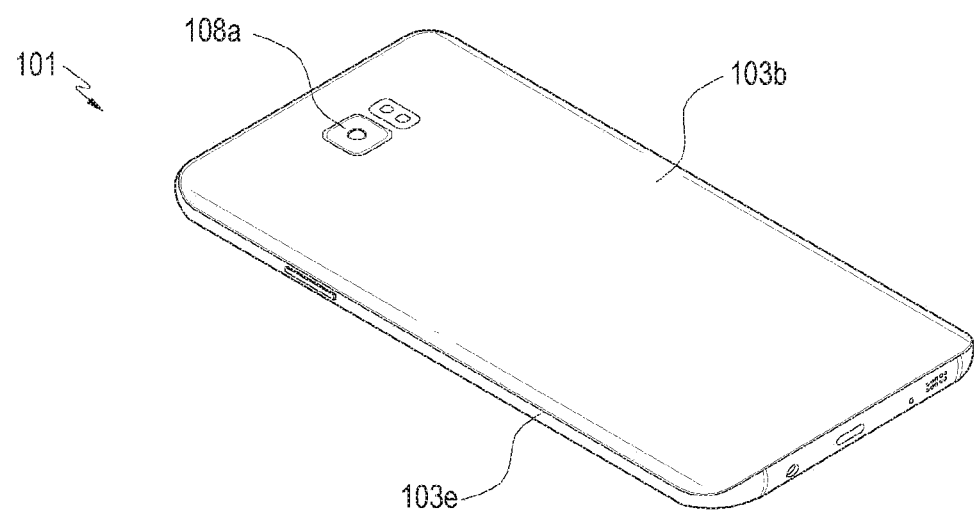
FIG. 3 is a diagram illustrating a rear view of an electronic device, according to an embodiment.

FIG. 2 is a diagram illustrating a front, perspective view of an electronic device (e.g., the electronic device 101 of FIG. 1), according to an embodiment. FIG. 3 is a diagram illustrating a rear, perspective view of an electronic device, according to an embodiment.

In the three-axis rectangular coordinate system as shown in FIG. 2, 'Y,' 'X,' and 'Z,' respectively, denote the width, length, and height direction of the electronic device 101.

Referring to FIGS. 2 and 3, the electronic device 101 includes a housing 103. The housing 103 includes a first surface 103a facing in the first direction +Z, a second surface 103b facing in the second direction −Z which is opposite to the first direction +Z, and a side surface 103e surrounding a space between the first surface 103a and the second surface 103b.

The housing 103 may have a front opening. A transparent cover may be provided to form at least part of the front surface 103a, closing the front opening of the front surface of the housing 103. According to an embodiment of the present disclosure, the transparent cover may be disposed over the whole front surface of the electronic device as viewed from above the first surface 103a.

According to an embodiment, a keypad with mechanical buttons or touch keys may be provided in a lower area of the front surface (e.g., the first surface 103a) of the housing 103. The touch keys may generate input signals as they are touched by the user's body. According to an embodiment of the present disclosure, the keypad may be implemented to include only mechanical buttons or only the touch keys. Various circuit devices, e.g., the processor 120, the memory 130, the input/output interface 150, and the communication interface 170 described above with respect to FIG. 1, may be received inside the housing 103. A battery 109 may also be received in the housing 210 to secure power.

According to an embodiment, a speaker 107e, a first camera 107a, an illumination sensor 107b, and a proximity sensor 107c are provided in an upper area of the front surface (e.g., the first surface 103a) of the housing 103. A second camera 108a, a flash, or a speaker is provided in the rear surface (e.g., the second surface 103b) of the housing 103.

Figure 4:
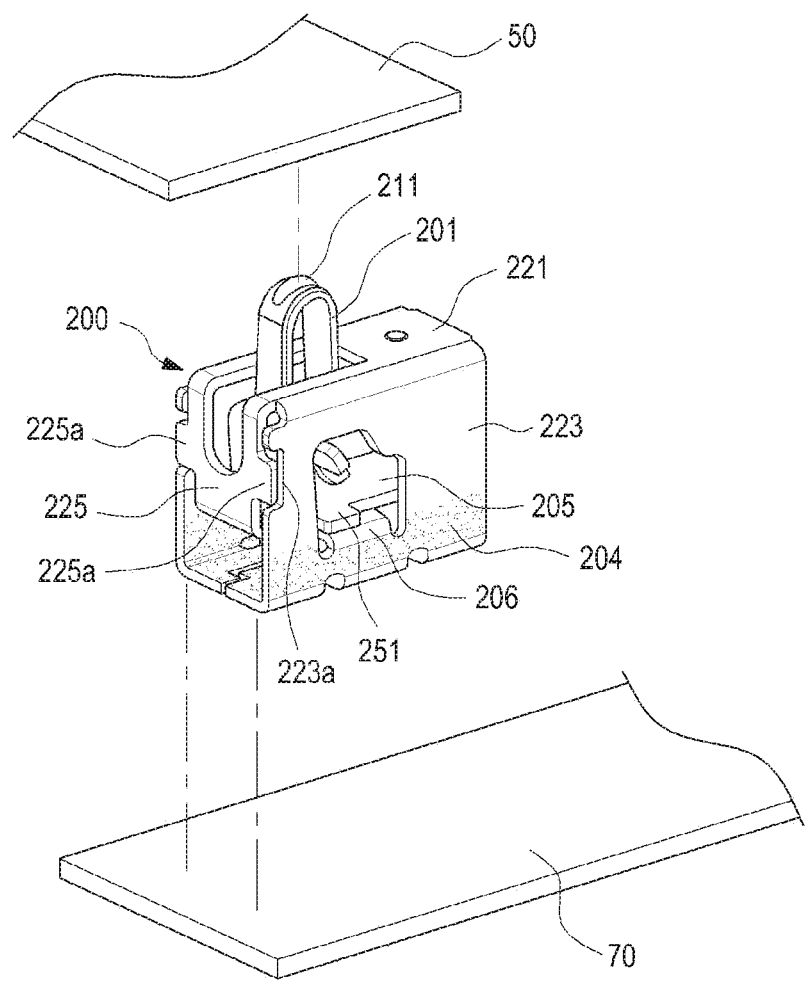
FIG. 4 is a diagram illustrating a perspective view of a connecting device included in an electronic device, according to an embodiment.
Figure 5:
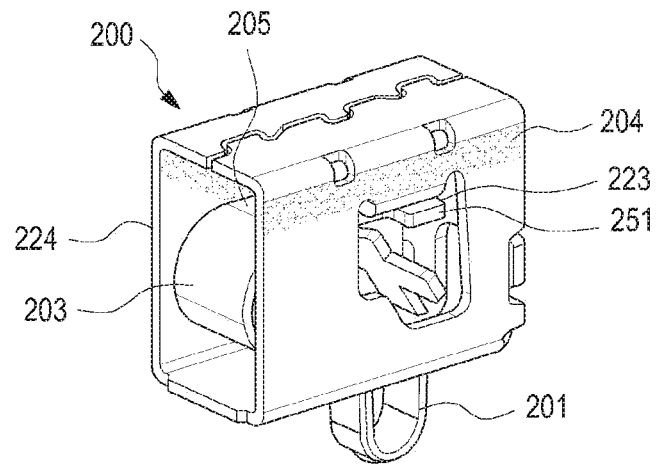
FIG. 5 is a diagram illustrating a perspective view of a connecting device included in an electronic device, as viewed in a different direction, according to an embodiment.
Figure 6:
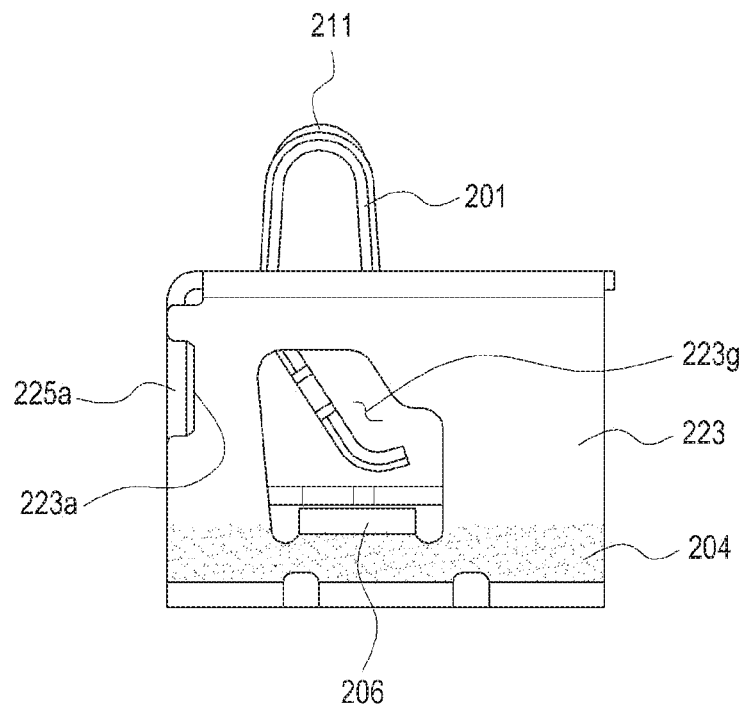
FIG. 6 is a diagram illustrating a side view of a connecting device included in an electronic device, according to an embodiment.

FIG. 4 is a diagram illustrating a perspective view of a connecting device included in an electronic device (e.g., the electronic device 101 of FIG. 2), according to an embodiment. FIG. 5 is a diagram illustrating a perspective view of a connecting device included in an electronic device, as viewed in a different direction, according to an embodiment. FIG. 6 is a diagram illustrating a side view of a connecting device included in an electronic device, according to an embodiment.

Referring to FIGS. 4 to 6, a connecting device 200 included in the electronic device (e.g., the electronic device 101 of FIG. 2) may be disposed inside the housing (e.g., the housing 103 of FIG. 2) of the electronic device (e.g., the electronic device 101 of FIG. 2) to electrically connect an external contact terminal 50 with a circuit board 70. For example, the external contact terminal 50 may be part of a side part (e.g., the side part 103e of FIG. 2) of the housing (e.g., the housing 103 of FIG. 2), and the circuit board 70 may be mounted in the housing (e.g., the housing 103 of FIG. 2). The connecting device 200 includes a movable part 201, an elastic part 203, a support 205, protecting walls 221, 223, 224, and 225, an extension 204, and a base part 206.

The movable part 201 includes a contacting part 211 protruding from one surface of the movable part 201. The contacting part 211 may contact the rear surface of the external contact terminal 50. One surface of the movable part 201 may be avoided from contacting the rear surface of the external contact terminal 50, preventing corrosion due to contact to the external contact terminal 50.

The elastic part 203 connects to the movable part 201 and is shaped as the letter "C." The elastic part 203 may provide an elastic force to allow the movable part 201 to move. The elastic part 203 is not limited as having a C shape but may be formed in other various shapes (e.g., an S shape).

The support 205 connects to the elastic part 203. The support 205 supports the elastic part 203 connected to the movable part 201.

The protecting walls 221, 223, 224, and 225 include a first side wall 225, a front wall 221, a second side wall 223, and a third side wall 224. The first side wall 225 connects to the support 205.

The front wall 221 connects to the first side wall 225 and may restrict the movement of the movable part 201 by the external contact terminal 50. The front wall 221 may be utilized as a surface that is sucked up to a sucking nozzle upon a surface-mount device (SMD) process for mounting the connecting device 200 on the circuit board 70.

The second side wall 223 connects to the front surface 221, protecting the side surface of the movable part 201 and the side surface of the elastic part 203 against external impacts. The third side wall 234 connects to the front wall 221, facing the second side wall 233. The third side wall 234, together with the second side wall 223, may protect the side surface of the movable part 201 and the side surface of the elastic part 203 against external impacts.

The first side wall 225 includes at least one first fixing part 225a that protrudes. At least one of the second side wall 223 and the third side wall 224 includes a second fixing part 223a engaged with the first fixing part 225a. Since the first fixing part 225a is engaged with the second fixing part 223a and remains in a fixed position, the first side wall 225 may remain fastened with at least one of the second side wall 223 and the third side wall 224. The first side wall 225, although receiving an impact by the support 205 connected with the elastic part 203, may remain fastened with at least one of the second side wall 223 and the third side wall 224 as the first fixing part 225a is engaged with the second fixing part 223a.

The extension 204 extends from at least one protecting wall 223 and 224 in the moving direction of the movable part 201 and may be mounted on the circuit board 70. The extension 204 extends from at least one protecting wall 223 and 224 in the moving direction of the movable part 201, bringing the movable part 201 close to the external contact terminal 50. For example, the extension 204 may narrow the gap between the movable part 201 and the external contact terminal 50, reducing the distance at which the movable part 201 moves vertically. Reducing the moving distance of the movable part 201 may prevent the elastic part 203 from losing elasticity.

The base part 206 is provided in the extension 204 and extends inward of the extension 204 from the extension 204, backing up the support 205.

At least one of the second side wall 223 and the third side wall 224 has an opening 223g. The support 205 includes a stopper 251 protruding towards the opening 223g. Since the stopper 251 is engaged with the top of the extension 204, the support 205 may be supported by the extension 204.

Figure 7:
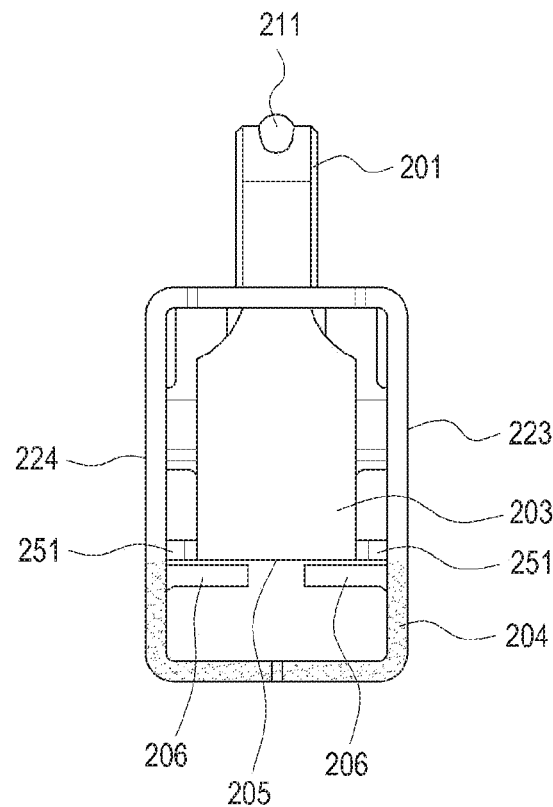
FIG. 7 is a diagram illustrating a side view of a connecting device included in an electronic device, as viewed in a different direction, according to an embodiment.

FIG. 7 is a diagram illustrating a side view of a connecting device (e.g., the connecting device 200 of FIG. 4) included in an electronic device (e.g., the electronic device 101 of FIG. 2), as viewed in a different direction, according to an embodiment.

Referring to FIG. 7, a plurality of base parts 206 that extend inwards from upper portions of the extension 204 are provided. The plurality of base parts 206 are shaped to be parallel with the rear surface of the support 205, backing up the support 205. The respective ends of the plurality of base parts 206 may be spaced apart from each other. According to an embodiment of the present disclosure, the respective ends of the plurality of base parts 206 may contact each other.

Figure 8:
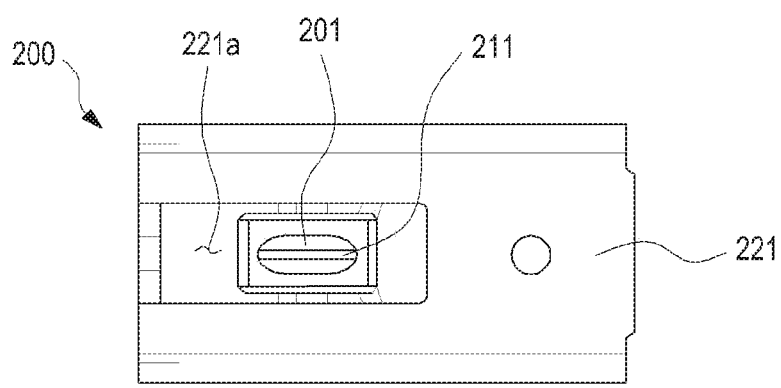
FIG. 8 is a diagram illustrating a plan view of a connecting device included in an electronic device, according to an embodiment.

FIG. 8 is a diagram illustrating a plan view of a connecting device (e.g., the connecting device 200 of FIG. 4) included in an electronic device (e.g., the electronic device 101 of FIG. 2), according to an embodiment.

Referring to FIG. 8, the front wall 221 includes an opening 221a for allowing the movable part 201 to move. The movable part 201 may move while being exposed from the front wall 221 through the opening 221a or may move to the inside of the front wall 221.

Figure 9:
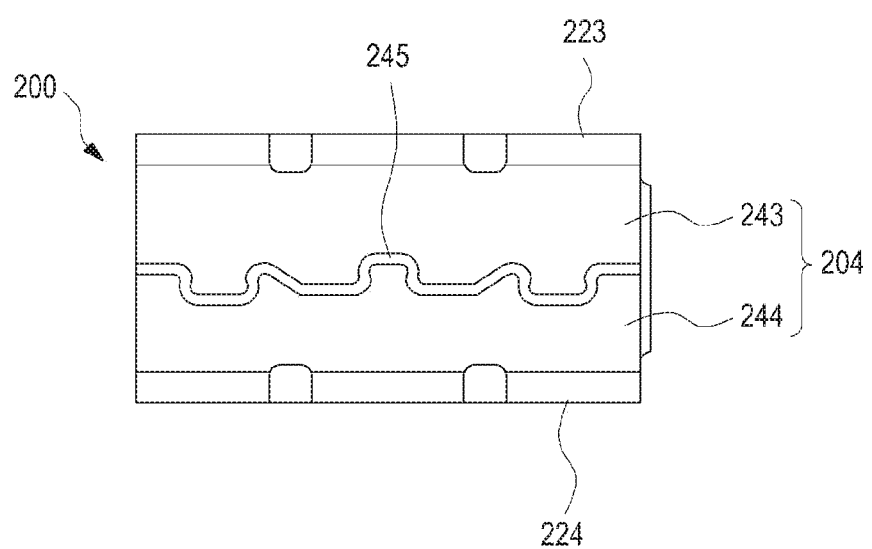
FIG. 9 is a diagram illustrating a rear view of a connecting device included in an electronic device, according to an embodiment.

FIG. 9 is a diagram illustrating a rear view of a connecting device (e.g., the connecting device 200 of FIG. 4) included in an electronic device (e.g., the electronic device 101 of FIG. 2), according to an embodiment.

Referring to FIG. 9, the extension 204 includes a first extension 243 and a second extension 244. The first extension 243 extends from the second side wall 223, facing in a direction perpendicular to the second side wall 223. The second extension 244 extends from the third side wall 224, facing in a direction perpendicular to the third side wall 224. An end of the second extension 244 may be shaped corresponding to an end of the first extension 243. Since an end of the second extension 244 is positioned adjacent to the first extension 243, a parting line 245 may be formed in the extension 204. According to an embodiment of the present disclosure, an end of the second extension 244 contacts an end of the first extension 243.

Figure 10:
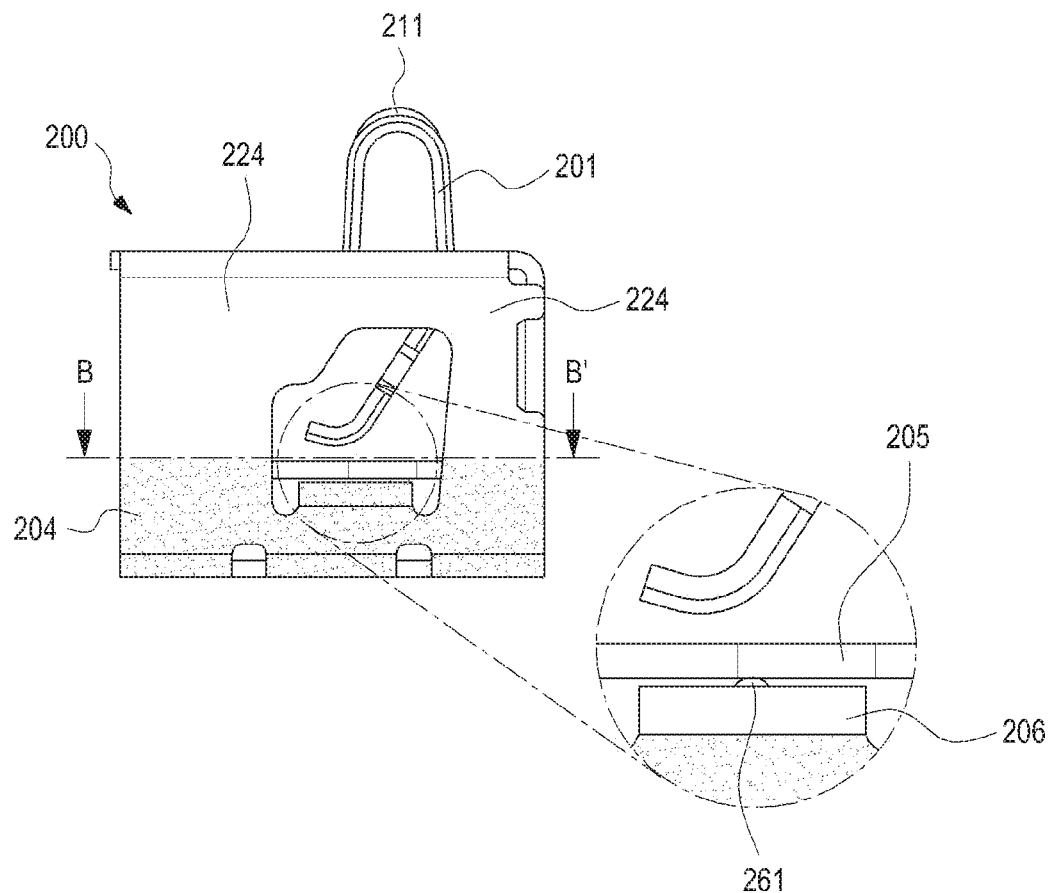
FIG. 10 is a diagram illustrating a side view in which a supporting part is backed up by a base part of a connecting device included in an electronic device, according to an embodiment.
Figure 11:
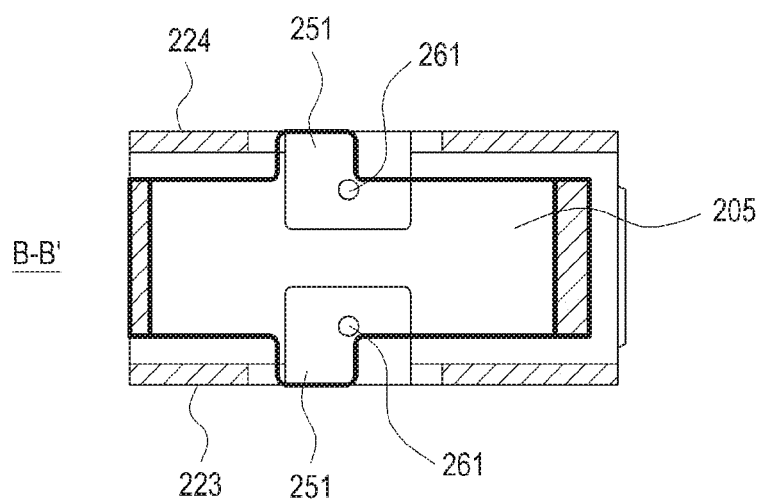
FIG. 11 is a diagram illustrating a cross-sectional view taken along line B-B' of FIG. 10, according to an embodiment.

FIG. 10 is a diagram illustrating a side view of a support (e.g., the support 205 of FIG. 4) backed up by a base part (e.g., the base part 206 of FIG. 4) of a connecting device (e.g., the connecting device 200 of FIG. 4) included in an electronic device (e.g., the electronic device 101 of FIG. 2), according to an embodiment. FIG. 11 is a diagram illustrating a cross-sectional view taken along line B-B' of FIG. 10, according to an embodiment.

Referring to FIGS. 10 and 11, the base part 206 includes at least one protrusion 261 that projects towards the support 205. The at least one protrusion 261 contacts the rear surface of, and thus, electrically connect to, the support 205. Since the at least one protrusion 261 forms a space between the rear surface of the support 205 and one surface of the base part 206, the rear surface of the support 205 and the one surface of the base part 206 may be plated using the space. According to an embodiment of the present disclosure, the at least protrusion 261 may be formed by pressing on one surface of the base part 206 using a press. The at least one protrusion 261 may be shaped as a semi-sphere. According to an embodiment of the present disclosure, the at least one protrusion 261 is not limited as having a semi-spherical shape but may be formed in other various shapes.

Figure 12:
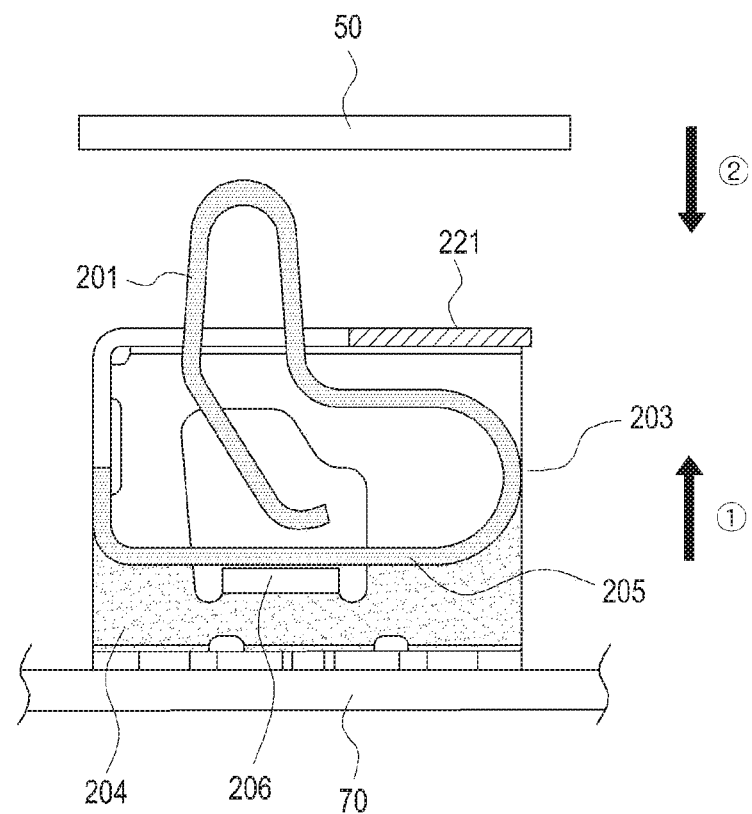
FIG. 12 is a diagram illustrating a cross-sectional view of a connecting device before being pressed by an external contact terminal, according to an embodiment.
Figure 13:
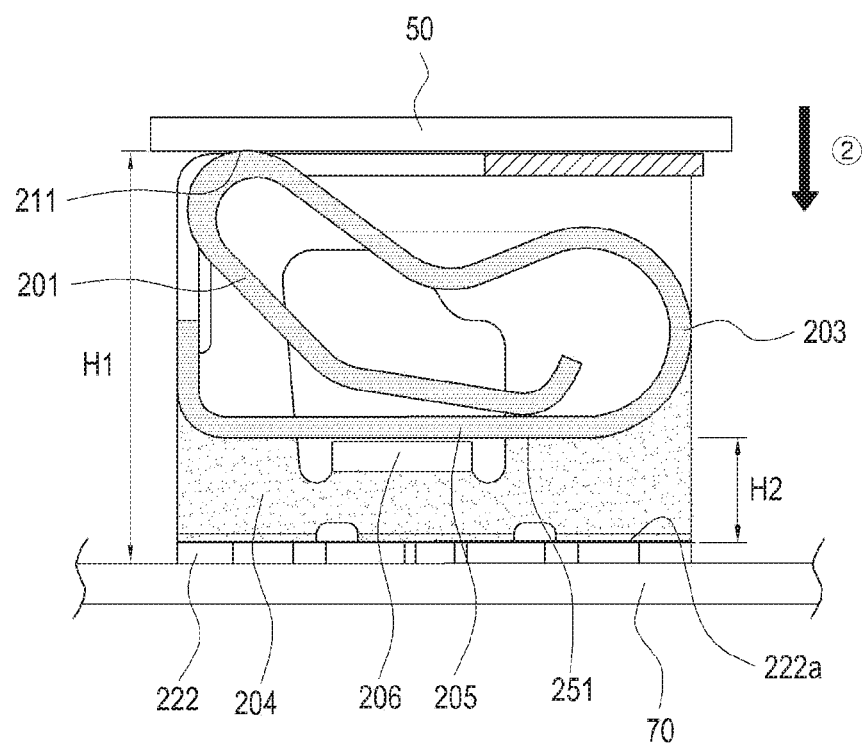
FIG. 13 is a diagram illustrating a cross-sectional view of a connecting device pressed by an external contact terminal, according to an embodiment.

FIG. 12 is a diagram illustrating a cross-sectional view of a connecting device (e.g., the connecting device 200 of FIG. 4) before pressed by an external contact terminal (e.g., the external contact terminal 50 of FIG. 4), according to an embodiment. FIG. 13 is a diagram illustrating a cross-sectional view of a connecting device pressed by an external contact terminal, according to an embodiment.

Referring to FIGS. 12 and 13, the elastic part 203 provides an elastic force to the movable part 201 in a first direction ① which is perpendicular to the front wall 221.

According to an embodiment of the present disclosure, the connecting device 200 is pressed in a second direction ②, which is opposite to the first direction ①, by the external contact terminal 50 while being mounted and seated on the circuit board 70. The movable part 201, as pressed by the external contact terminal 50, moves in the second direction ②.

The connecting device 200 is disposed at a first height H1 between the external contact terminal 50 and the circuit board 70.

Various design changes may be made in the connecting device 200 by varying the height of the extension 204 from the base part 206 disposed at a second height H2, thus allowing it to be designed adaptive to the structure in which the interval between the external contact terminal 50 and the circuit board 70 is varied.

Figure 14:
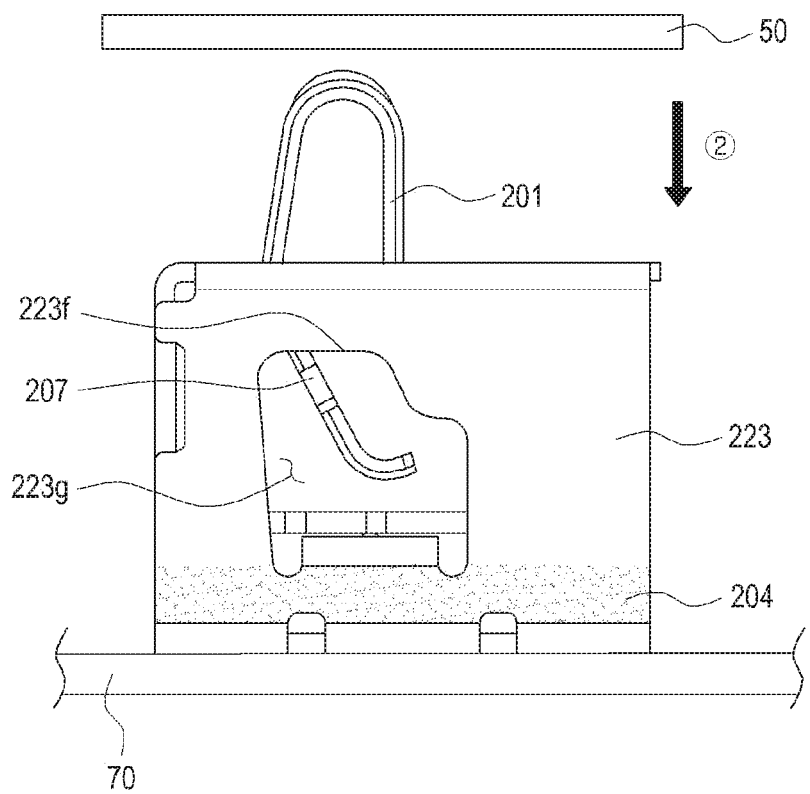
FIGS. 14 to 16 are diagrams illustrating side views of a process of a connecting device being pressed by an external contact terminal, according to an embodiment.
Figure 15:
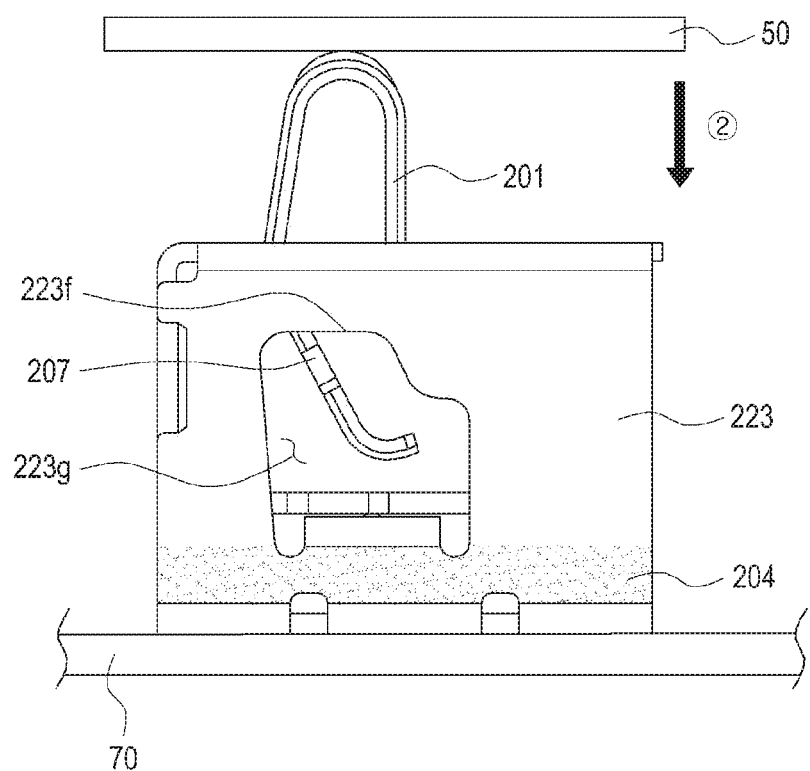
Figure 16:
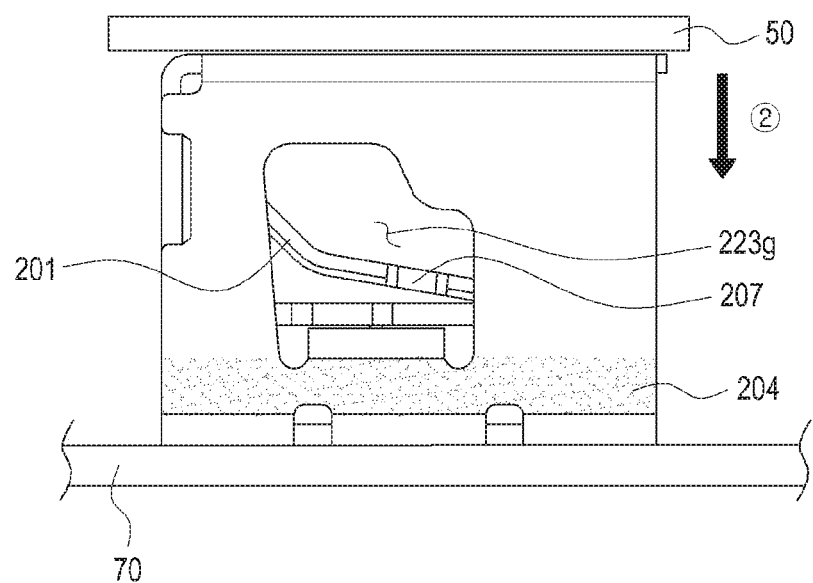

FIGS. 14 to 16 are diagrams illustrating side views of a process of a connecting device (e.g., the connecting device 200 of FIG. 4) being pressed by an external contact terminal (e.g., the external contact terminal 50 of FIG. 4), according to an embodiment.

Referring to FIGS. 14 to 16, the connecting device 200 includes anti-floating parts to restrict the elastic part 203 from floating. The anti-floating parts include an opening 223g, a first hanging part 207, and a second hanging part 223f. The opening 223g is formed in at least one of the second side wall 223 and the third side wall (e.g., the third side wall 224 of FIG. 4). Since the first hanging part 207 extends from the movable part 201, the first hanging part 207 remains in the opening 223g. The first hanging part 207 moves along the opening 223 as the movable part 201 moves. The second hanging part 223f is formed in at least one of the second side wall 223 and the third side wall (e.g., the third side wall 224 of FIG. 4), and the first hanging part 207 is engaged with the second hanging part 223f. Since the first hanging part 207 is engaged with the second hanging part 223f, the plurality of elastic parts 203 connected to the movable part 201 may be prevented from overly floating in the first direction (e.g., the first direction ① of FIG. 12).

Figure 17:
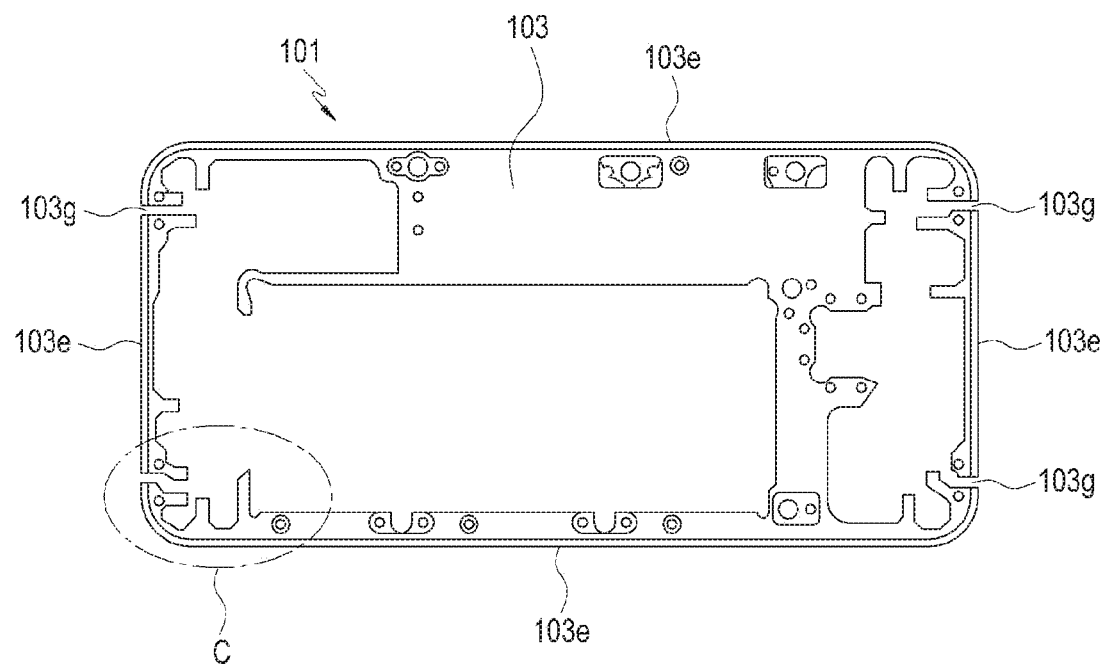
FIG. 17 is a diagram illustrating a plan view of an inside of an electronic device, according to an embodiment.

FIG. 17 is a diagram illustrating a plan view of an inside of an electronic device, according to an embodiment.

Referring to FIG. 17, an electronic device (e.g., the electronic device 101 of FIG. 2) includes the conductive housing 103, and the housing 103 includes the side parts 103e. The side parts 103e are disconnected from each other by separators 103g. The side parts 103e may be utilized as an antenna radiator for wireless communication.

Figure 18:
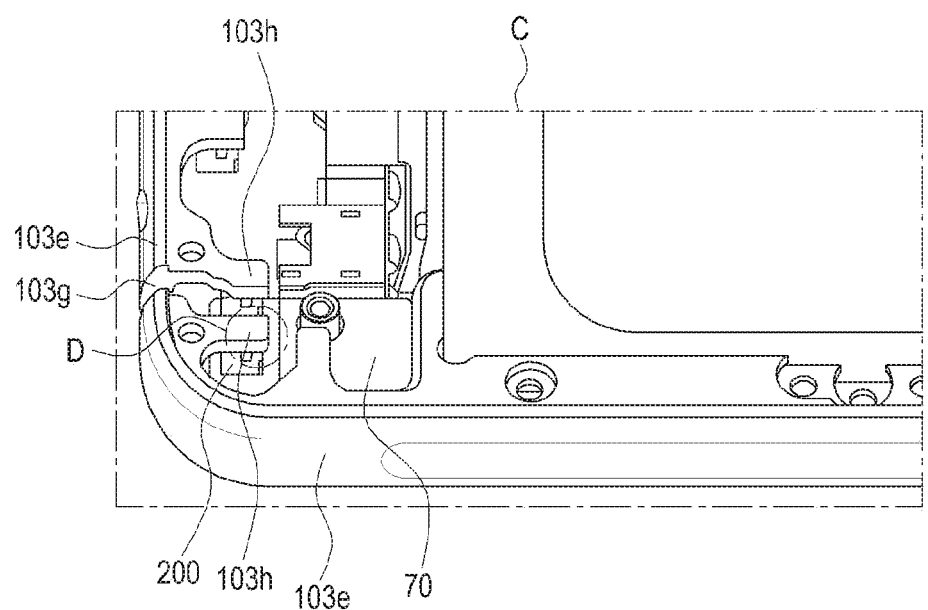
FIG. 18 is a diagram illustrating an enlarged view of portion C of FIG. 17, according to an embodiment.
Figure 19:
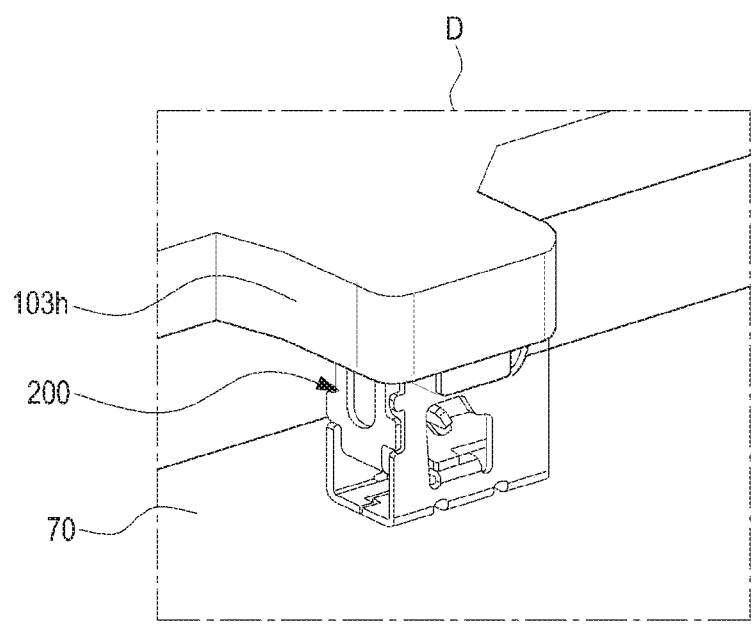
FIG. 19 is a diagram illustrating an enlarged view of portion D of FIG. 18, according to an embodiment.

FIG. 18 is a diagram illustrating an enlarged view of portion C of FIG. 17 according to an embodiment. FIG. 19 is a diagram illustrating an enlarged view of portion D of FIG. 18, according to an embodiment.

Referring to FIGS. 18 and 19, the side parts 103e include connecting parts 103h (e.g., the connecting parts 40 of FIG. 4) that protrude to the inside of the housing (e.g., the housing 103 of FIG. 15). According to an embodiment of the present disclosure, the connecting device 200 electrically connects the connecting parts 103h with the circuit board 70.

Figure 20:
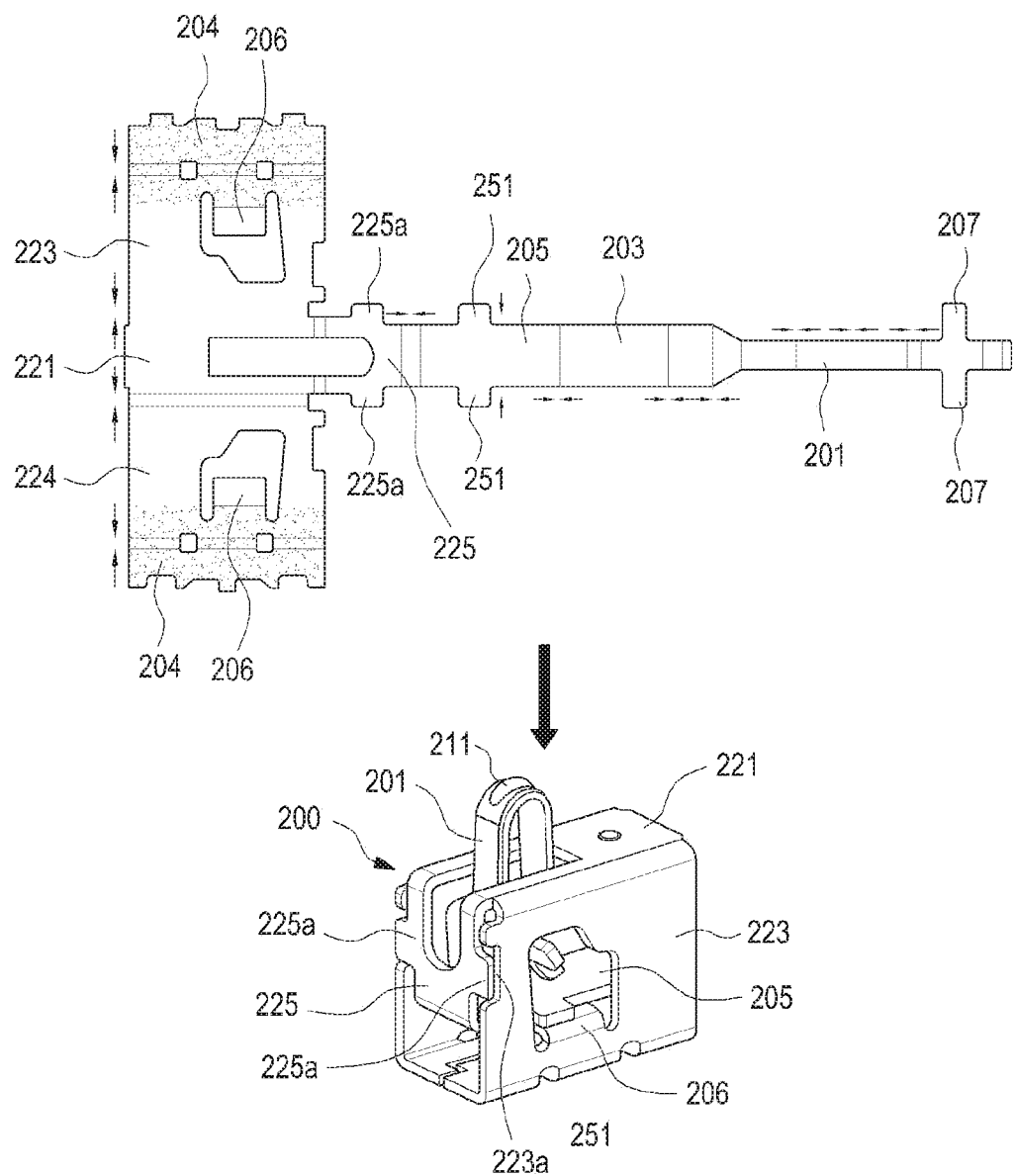
FIG. 20 is a diagram illustrating a process of assembling a connecting device included in an electronic device, according to an embodiment.

FIG. 20 is a diagram illustrating a process of assembling a connecting device (e.g., the connecting device 200 of FIG. 19) included in an electronic device (e.g., the electronic device 101 of FIG. 17), according to an embodiment.

Referring to FIG. 20, the movable part 201 is integrally formed with the first hanging part 207. The elastic part 203 is integrally formed with the movable part 201 and is thus integrally formed with the support 205. The support 205 is integrally formed with the stopper 251 and is thus integrally formed with the first side wall 225. Since the first side wall 225 is integrally formed with the first fixing part 225a, it is integrally formed with the front wall 221. Since the front wall 221 is integrally formed with the second side wall 223, it is integrally be formed with the third side wall 224. Since the extension 204 is integrally formed with the second side wall 223, it is integrally be formed with the third side wall 224. The base part 206 is integrally be formed with the extension 204.

The movable part 201, the elastic part 203, the support 205, the first side wall 225, the front wall 221, the second side wall 223, the third side wall 224, and the base part 206 each are bent, allowing the connecting device 200 to form a stereoscopic shape.

Figure 21:
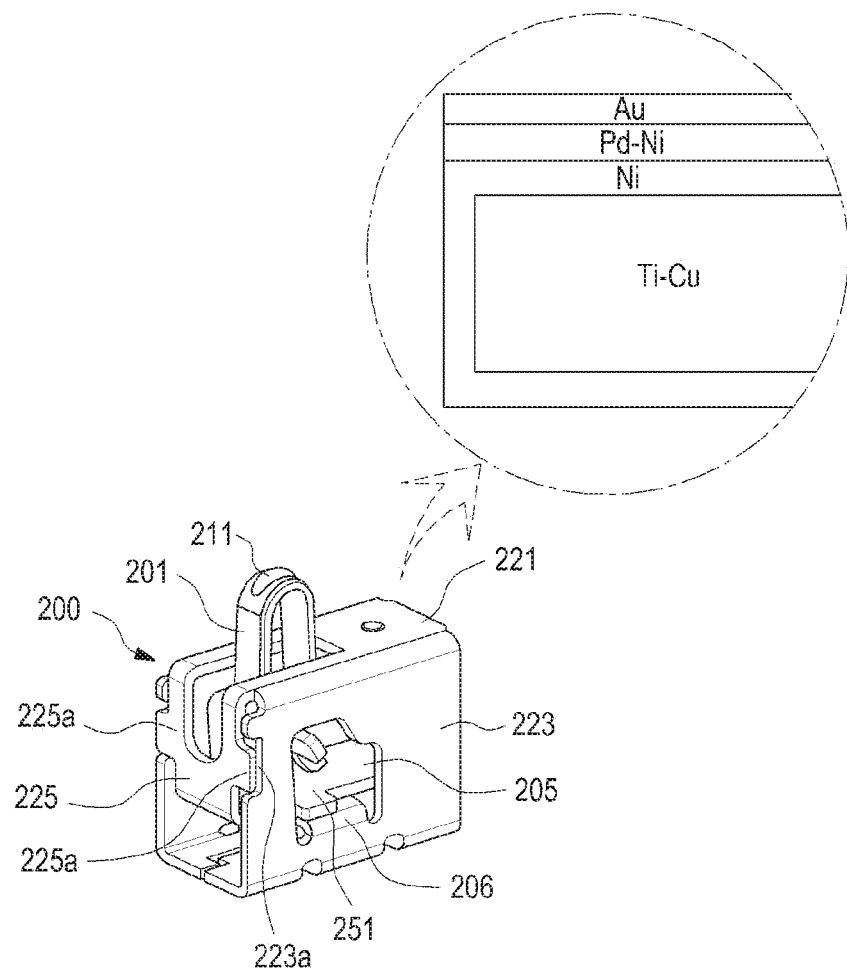
FIG. 21 is a diagram illustrating a material of a connecting device included in an electronic device, according to an embodiment.

FIG. 21 is a diagram illustrating a material of a connecting device (e.g., the connecting device 200 of FIG. 19) included in an electronic device (e.g., the electronic device 101 of FIG. 17), according to an embodiment.

Referring to FIG. 21, the movable part 201, the support 205, the elastic part 203, the at least one protecting wall 221, 223, 224, and 225, the extension 204, and the base part 206 may be formed of conductive materials.

The contacting part 211 is formed of a stack of titanium (Ti)-copper (Cu), nickel (Ni), palladium (Pd)—Ni, and gold (Au) layers. For example, the contacting part 211 includes a base body formed of Ti—Cu, and the Ti—Cu base body may be plated with a Ni layer that is 1.5 μm to 4.0 μm thick, a Pd—Ni layer that is about 0.2 μm thick, and an Au layer that 0.05 μm thick.

The rear part of the extension 204 may be formed of a stack of a Ti—Cu layer, a Ni layer, and an Au layer. For example, the rear part of the extension 204 may include a base body formed of Ti—Cu, and the Ti—Cu base body may be plated with a Ni layer that is 1.5 μm to 4.0 μm thick, a Ni layer that is 1.5 μm to 4.0 μm thick, and an Au layer that 0.05 μm thick.

At least one of the movable part 201, the support 205, the elastic part 203, the at least one protecting wall 221, 223, 224, and 225, a side part of the extension 204, and the base part 206 may include a Ti—Cu base body, and the Ti—Cu base body may be plated with a Ni layer that 1.5 µm to 3.5 µm thick.

Figure 22:
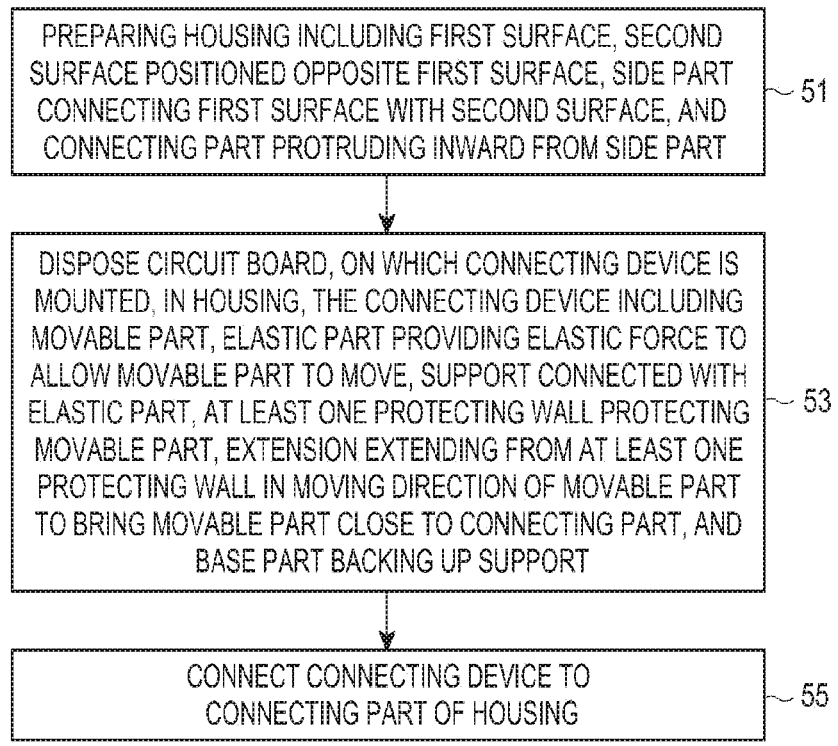
FIG. 22 is a flowchart illustrating a method of operating a connecting device included in an electronic device, according to an embodiment.

FIG. 22 is a flowchart illustrating a method for manufacturing a connecting device (e.g., the connecting device 200 of FIG. 19) included in an electronic device (e.g., the electronic device 101 of FIG. 17), according to an embodiment.

Referring to step 51 of FIG. 22, a housing (e.g., the housing 103 of FIG. 2) is prepared that includes a first surface (e.g., the first surface 103a of FIG. 2), a second surface (e.g., the second surface 103b of FIG. 3) which is positioned opposite the first surface, a side part (e.g., the side part 103e of FIG. 17) connecting the first surface with the second surface, and a connecting part (e.g., the connecting part 103h of FIG. 18) protruding inward from the side part.

In step 53 of FIG. 22, a circuit board (e.g., the circuit board 70 of FIG. 16) on which a connecting device (e.g., the connecting device 200 of FIG. 19) is mounted is disposed in the housing (e.g., the housing 103 of FIG. 3), the connecting device including a movable part (e.g., the movable part 201 of FIG. 4), an elastic part (e.g., the elastic part 203 of FIG. 4) providing an elastic force for moving the movable part, a support (e.g., the support 205 of FIG. 4) connecting with the elastic part, at least one protecting wall (e.g., at least one protecting wall 221, 223, 224, and 225) protecting the movable part, an extension (e.g., the extension 204 of FIG. 4) extending from the protecting wall in the moving direction of the movable part to bring the movable part close to the connecting part, and a base part (e.g., the base part 206 of FIG. 4) backing up the support.

In step 55 of FIG. 22, the connecting device (e.g., the connecting device 200 of FIG. 19) may be connected to the connecting part (e.g., the connecting part 103h of FIG. 18) of the housing.

Figure 23:
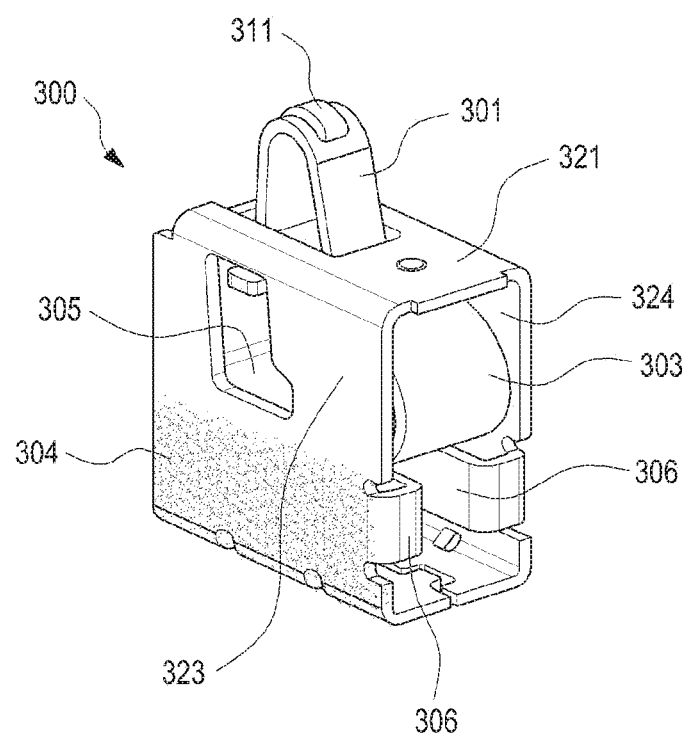
FIG. 23 is a diagram illustrating a perspective view of a connecting device included in an electronic device, according to an embodiment.
Figure 24:
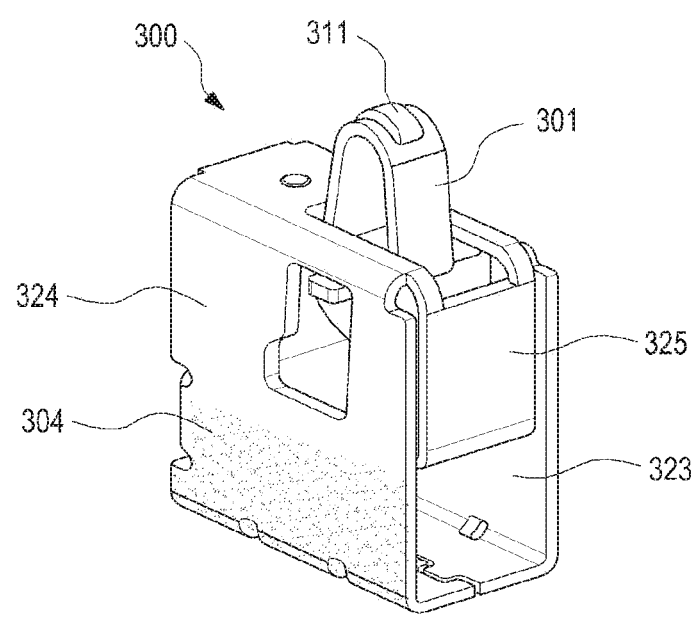
FIG. 24 is a diagram illustrating a perspective view of a connecting device included in an electronic device, as viewed in a different direction, according to an embodiment.

FIG. 23 is a diagram illustrating a perspective view of a connecting device 300 included in an electronic device (e.g., the electronic device 101 of FIG. 4), according to an embodiment. FIG. 24 is a diagram illustrating a perspective view of a connecting device included in an electronic device, as viewed in a different direction, according to an embodiment.

Referring to FIGS. 23 and 24, according to an embodiment of the present disclosure, the electronic device 300 includes a movable part 301 including a contacting part 311, an elastic part 303, a support 305, at protecting walls 321, 323, 324, and 325, an extension 304, and base parts 306. According to an embodiment of the present disclosure, the base parts 306 extend from the side surfaces of the extension 304 and are bent to the inside of the extension 304.

Figure 25:
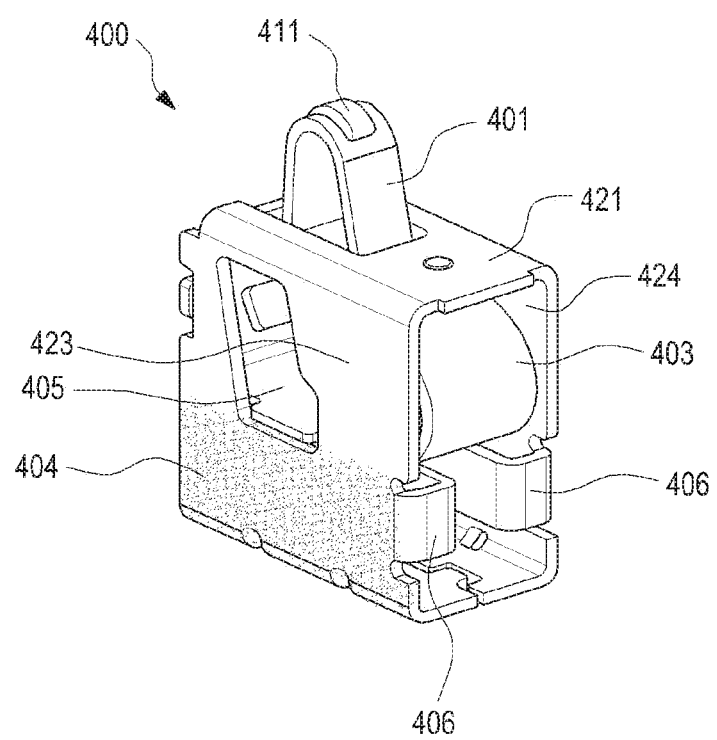
FIG. 25 is a diagram illustrating a perspective view of a connecting device included in an electronic device, according to an embodiment.
Figure 26:
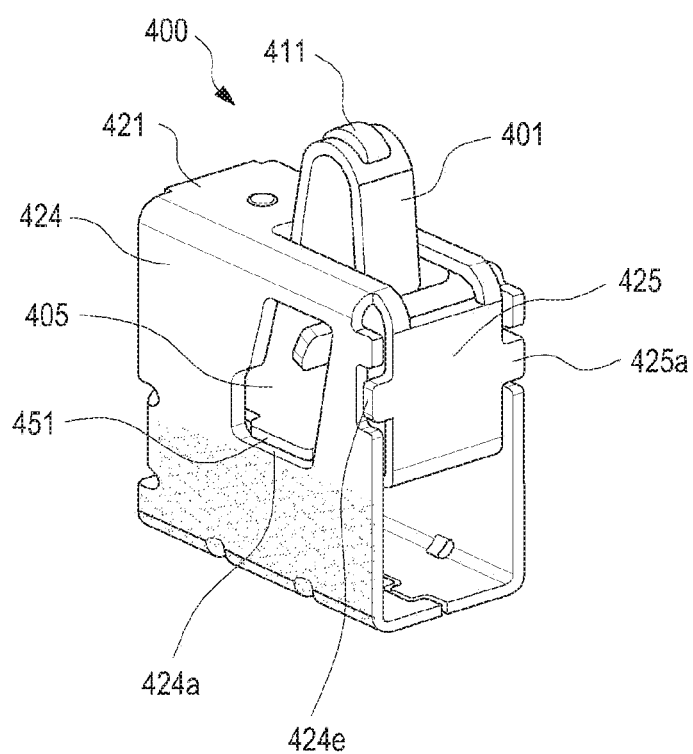
FIG. 26 is a diagram illustrating a perspective view of a connecting device included in an electronic device, as viewed in a different direction, according to an embodiment.

FIG. 25 is a diagram illustrating a perspective view of a connecting device 400 included in an electronic device (e.g., the electronic device 101 of FIG. 2), according to an embodiment. FIG. 26 is a diagram illustrating a perspective view of a connecting device included in an electronic device, as viewed in a different direction, according to an embodiment.

Referring to FIGS. 25 and 26, the electronic device 400 includes a movable part 401 including a contacting part 411, an elastic part 403, a support 405, at least one protecting wall 421, 423, 424, and 425, an extension 404, and base parts 406. The at least one protecting wall 421, 423, 424, and 425 includes a first side wall 425, a front wall 421, a second side wall 423, and a third side wall 424.

The first side wall 425 includes at least one first fixing part 425a that protrudes. At least one of the second side wall 423 and the third side wall 424 includes a second fixing part 423a engaged with the first fixing part 425a. As the first fixing part 425a is engaged with the second fixing part 423a and remains in a fixed position, the first side wall 425 may remain fastened with at least one of the second side wall 423 and the third side wall 424.

At least one of the second side wall 423 and the third side wall 424 has an opening. The support 405 includes a stopper 451 protruding towards the opening. As the stopper 451 is engaged with the top of the extension 404, the support 405 may be supported by the extension 404.

As is apparent from the foregoing description, according to embodiments of the present disclosure, the connecting device and electronic device comprising the same includes extensions that extend from the protecting walls in the moving direction of the movable part to bring the movable part close to the external contact terminal, reducing the degree of movement of the movable part due to contacting the external contact terminal and thus preventing a lowering in elasticity of the elastic part due to steady and repetitive pressing on the movable part.

According to embodiments of the present disclosure, the connecting device and electronic device comprising the same include at least one protecting wall to protect the movable part, preventing the connecting device from deforming due to external impacts.

While the present disclosure has been shown and described with reference to embodiments thereof, it will be apparent to those of ordinary skill in the art that various changes in form and detail may be made thereto without departing from the spirit and scope of the present disclosure as defined by the following claims.

What is claimed is:

1. An electronic device including a connecting device, the electronic device comprising:
    a housing including a first surface, a second surface positioned opposite the first surface, and a side part connecting the first surface with the second surface;
    a connecting part protruding from the side part to an inside of the housing;
    a circuit board disposed inside the housing; and
    the connecting device electrically connecting the connecting part with the circuit board,
    wherein the connecting device comprises:
    a movable part contacting the connecting part,
    an elastic part connected to the movable part and configured to provide an elastic force enabling movement of the movable part,
    a support connected to the elastic part, at least one protecting wall connected to the support and configured to protect the movable part from external forces,
    an extension extending from the at least one protecting wall in a direction along which the movable part moves and in a direction perpendicular of the direction along which the movable part moves, and
    a base part provided within the extension and configured to reinforce the support.

2. The electronic device of claim 1, wherein the side part includes the contacting device configured of an antenna radiator for wireless communication.

3. The electronic device of claim 1, wherein the support comprises a stopper protruding towards the opening and engaged with the extension.

4. The electronic device of claim 1, wherein the at least one protecting wall comprises a first side wall connected to the support, a front wall connected to the first side wall and configured to restrict a movement of the movable part by an external contact terminal, a second side wall connected to the front wall and configured to protect a side surface of the movable part, and a third side wall connected to the front wall and facing the second side wall.

5. The electronic device of claim 4, wherein the first side wall comprises at least one first fixing part that protrudes, and wherein at least one of the second side wall and the third side wall includes a second fixing part engaged with the first fixing part, and wherein the first side wall remains affixed with the at least one of the second side wall and the third side wall.

6. The electronic device of claim 4, wherein the connecting device further includes an anti-floating part configured to restrict the elastic part from floating.

7. The electronic device of claim 6, wherein the anti-floating part comprises an opening formed in at least one of the second side wall and the third side wall, a first hanging part extending from the movable part and moving along the opening, and a second hanging part formed in at least one of the second side wall and the third side wall and configured to allow the first hanging part to be engaged therewith.

8. The electronic device of claim 4, wherein the movable part comprises a contacting part contacting and electrically connected with the external contact terminal.

* * * * *